Dec. 20, 1949 — R. WILLIAMSON ET AL — 2,491,538

TURNING AND THREADING ADAPTER

Filed Aug. 22, 1944

INVENTORS
JOSEPH M. BISHOP
ROBERT WILLIAMSON
BY Joseph Ch. Hazell
and Clade Koontz
ATTORNEYS

UNITED STATES PATENT OFFICE 2,491,538

TURNING AND THREADING ADAPTER

Robert Williamson, South Philipsburg, Pa., and Joseph H. Bishop, Dayton, Ohio

Application August 22, 1944, Serial No. 550,868

1 Claim. (Cl. 10—109)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to threading devices and particularly to those devices wherein a means is provided for turning stock to a suitable diameter prior to the cutting of a thread thereon.

It is an object of this invention to provide a simple combination turning and threading adapter as an accessory for use in conjunction with a lathe, drill press, or other convenient source of mechanical power.

It is another object of the invention to provide a turning and threading device having a minimum of mechanical parts and, consequently, being well adapted for rapid mass production, which is especially important in view of the present emergency and the need for such a device for inclusion in field kits for the repair of aircraft.

It is a further object of the invention to provide a device wherein round stock is turned down by machine power to the desired diameter by adjustable cutting bits, which are positioned by means of a plug gauge slidably supported in a bushing, said gauge corresponding to the diameter of a selected threading die and wherein the selected threading die is secured in the device by being substituted for the bushing, means being provided whereby the threading operation is hand powered.

It is a still further object of the invention to provide a combination turning and threading device requiring a minimum of manual motion consistent with structural simplicity in converting the device from the turning operation to the threading operation.

For a more complete understanding of the invention, reference is made to the description hereinafter given and to the appended drawings, in which.

Figure 1:
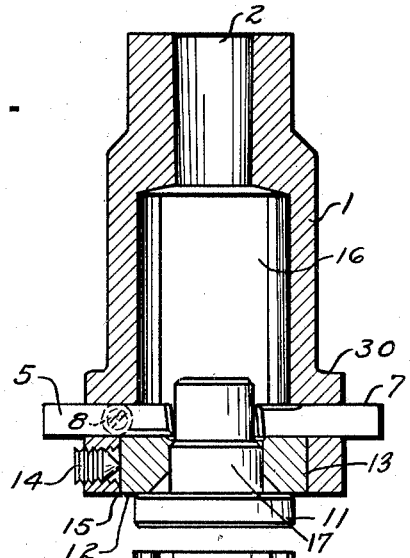
Fig. 1 shows a sectional elevation of the device, illustrating the manner in which the cutting bits are positioned by means of a plug gauge prior to the stock-turning operation.
Figure 3:
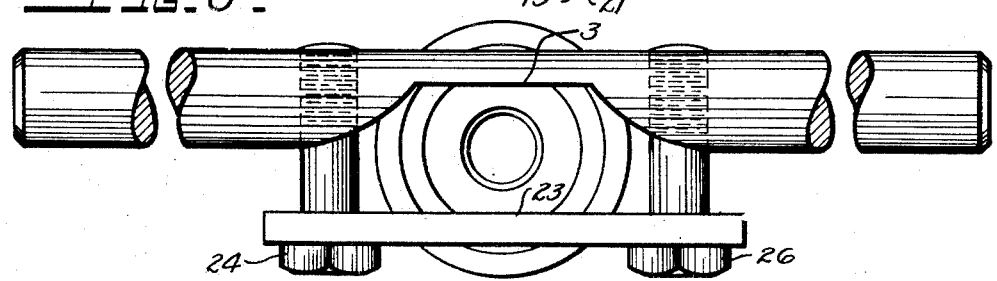
Fig. 3 is a plan view, illustrating the manner in which a handle is secured to the body of the device.

With reference to Fig. 1, 1 is a body member of generally cylindrical shape having a tapered bore 2 at the top to receive a tapered arbor for attachment to the head stock of a lathe or spindle of a drill press. On opposite sides of the body a certain amount of material has been removed, substantially exposing the interior thereof to permit egress of chips and cuttings and to provide flattened surfaces 3 for engagement with a handle 4, the coaction therebetween being best illustrated in Fig. 3. The handle 4 is not secured to the body during the machine powered turning operation, but is affixed thereto subsequently for the manually powered threading operation.

Adjustably supported radially of the body are cutting bits 5 and 7 secured in place in adjusted position by set screws 8 and 10. It will be obvious that axial rotation of body 1 will result in rotation of cutting bits 5 and 7 about the body axis and thus produce a cutting action on stock moving axially between the cutting bits 5 and 7.

Positioning of the cutting bits 5 and 7 for turning down stock to a diameter suitable for threading is accomplished by means of a plug gauge 11, centrally and slidably supported in a bushing 12, which is secured in annular recess or counterbored portion 13 by set screw 14. The positioning operation consists, first, in loosening set screws 8 and 10 and then withdrawing cutting bits 5 and 7 sufficiently to permit the plug gauge 11 to be inserted through bushing 12; whence the cutting bits are pushed inwardly to contact gauge surface 16, the set screws 8 and 10 being then tightened to secure the cutting bits 5 and 7 in position and finally the gauge 11 removed leaving the bushing 12 in place.

It will be appreciated that a plug gauge, to be used for positioning the cutting bits, must be of a diameter corresponding to the diameter of the threading die intended to be used. Accordingly, the device may be used in conjunction with a series of threading dies of various diameters, there being a corresponding size of plug gauge provided for each diameter of threading die. The bushing 12 coacts with all sizes of plug gauges intended for use with the device, since it is contemplated that all such gauges will have the same diameter as base portion 17 of plug gauge 11.

In the turning operation, when the device is attached to the headstock of a lathe for rotation, the stock is held in the tail stock and fed through the bushing 12 to the rotating cutting bits. When the device is attached to a drill press for rotation, the stock is vertically secured in a vise on the drill press table and operation of the drill press handle serves to move the rotating cutting bits along the stationary stock.

Figure 2:
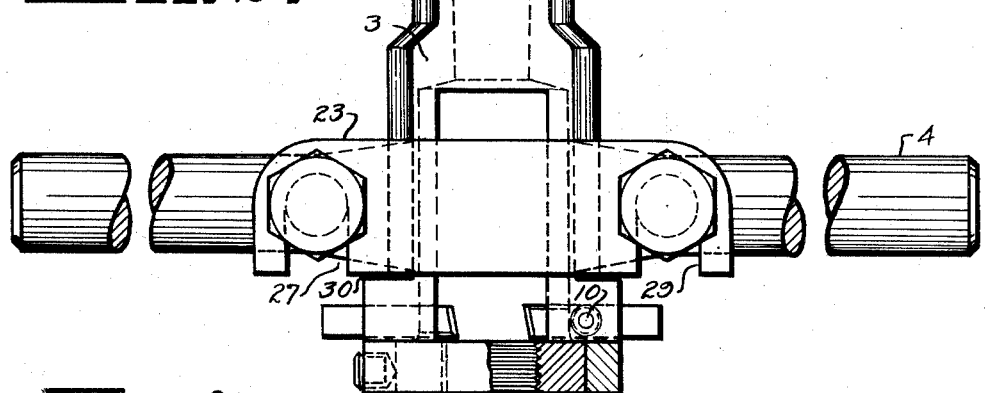
Fig. 2 is an elevation partially in section showing a threading die in place in readiness to commence the threading operation.

For the threading operation, a threading die 19 (Fig. 2) is substituted for the bushing 12 and a handle 4 is secured about body 1. The set screw 14 secures the threading die 19 in place in the same manner as it secured the bushing 12. The handle 4 is held to one side of the body against flattened surface 3 by means of a clamping plate 23 and secured thereto by bolts 24 and 26, said bolts threadedly engaging the handle member 4 and coacting at their head ends with the open slots 27 and 28 provided in the clamping plate 23. The handle 4 is adapted to rest on the shoulder 30 in operating position. It should be noted that cutting bits 5 and 7 are slightly withdrawn previous to the threading operation so that they will not interfere with the stock after it passes through the threading die.

Having thus disclosed the invention, what is claimed as new and desired to be protected by United States Letters Patent is:

A turning and threading device comprising an elongated body member, means comprising a tapered bore coaxial with respect to said body member and at one end thereof to provide for attachment of said body member to a rotatable drive shaft, a circular recess in said body member at the opposite end thereof, means extending transversely through a portion of said body member at said opposite end to secure a bushing or a threading die in said circular recess, the central portion of said body member being hollow from said recess to said tapered bore and said body member having elongated openings at opposite longitudinal sides thereof opening into the hollow central portion, transverse diametrically-opposite openings in said body member adjacent to said circular recess and opening into said hollow central portion, means extending through portions of said body member adjacent to said circular recess and adapted to secure cutting tools in said transverse openings in properly spaced position for turning down a piece of circular stock inserted into said body member through said circular recess and through said bushing, after completion of the turning operation the circular recess being adapted to receive the threading die in place of the bushing for cutting threads on said circular stock on the portion thereof which has been turned down by said cutting tools.

ROBERT WILLIAMSON.
JOSEPH H. BISHOP.

REFERENCES CITED

The following references are of record in the file of this patent:

UNITED STATES PATENTS

| Number | Name | Date |
|---|---|---|
| 199,408 | Bunckmann | Jan. 22, 1878 |
| 598,591 | Barrel | Feb. 8, 1898 |
| 813,114 | Preuss | Feb. 20, 1906 |
| 913,520 | Lassiter | Feb. 23, 1909 |
| 1,006,958 | Lassiter | Oct. 24, 1911 |
| 1,113,023 | Land | Oct. 6, 1914 |
| 1,131,364 | Gary | Mar. 9, 1915 |
| 1,902,909 | Wheeler | Mar. 28, 1933 |